United States Patent [19]

Gordon

[11] Patent Number: 5,000,117

[45] Date of Patent: Mar. 19, 1991

[54] TANK COVER

[76] Inventor: Richard A. Gordon, 95 W. 3rd St., Freeport, N.Y. 11520

[21] Appl. No.: 205,311

[22] Filed: Jun. 9, 1988

[51] Int. Cl.⁵ .............................................. A01K 63/00
[52] U.S. Cl. ...................................................... 119/5
[58] Field of Search ..................... 119/5; 220/306, 324, 220/326

[56] References Cited

U.S. PATENT DOCUMENTS

| | | | |
|---|---|---|---|
| 3,225,736 | 12/1965 | Willinger et al. | 119/5 |
| 4,078,522 | 3/1978 | Akers | 119/5 |
| 4,161,157 | 7/1979 | Haugen | 119/1 |
| 4,342,403 | 8/1982 | Badtke et al. | 220/306 |
| 4,576,115 | 3/1986 | Gordon | 119/5 |
| 4,795,056 | 1/1989 | Meyers | 220/306 |

Primary Examiner—Robert P. Swiatek
Assistant Examiner—Todd E. Manahan
Attorney, Agent, or Firm—Bauer & Schaffer

[57] ABSTRACT

A cover for a rimmed animal or fish tank is provided with a frame having a plurality of fixed depending tabs and at least one removable tab. The removable tabs are provided with an inwardly directed shaped flange at its lower end adapted to engage the wall of the tank below the rim to cause the fixed tabs to be biased in resilient engagement with the tank wall to secure the cover on the tank.

8 Claims, 2 Drawing Sheets

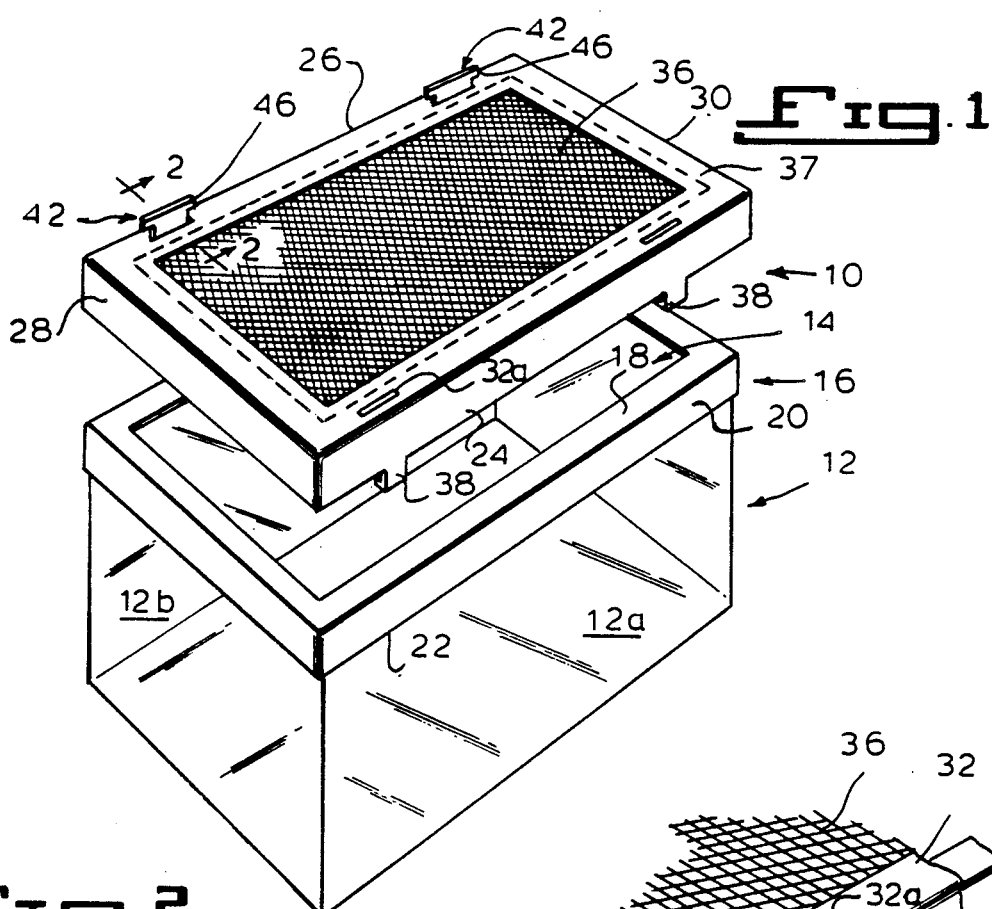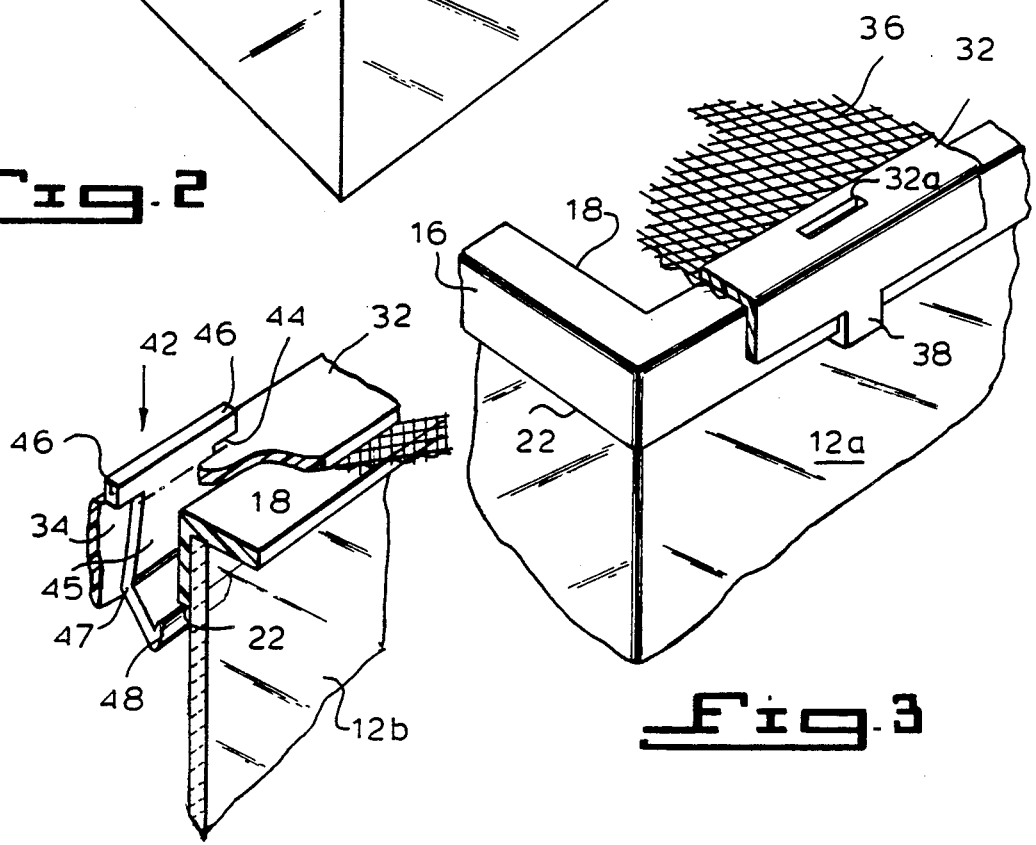

TANK COVER

BACKGROUND OF THE INVENTION

The present invention is directed to a cover for a tank. More particularly, the invention is directed to a cover for an animal tank, fish tank, or the like which may be easily installed over the tank and easily removed therefrom and which in its installed position is secured to the tank so that it may not be inadvertently dislodged or removed.

Animal tanks and fish tanks and the like require covers not only for the protection of the animal or fish, but for the protection of children and the like. Generally such tanks are provided with covers which, while permitting normal communication with the atmosphere, must enclose the tanks so that animals or fish therein cannot lift or displace the same or that foreign matter cannot inadvertently be thrown or dropped into the tank. Still further, the tank cover must be securely fastened to the tank so that the cover is not accidentally dislodged by a child or the user. On the other hand, the cover must be easily removable so that access to the tank for feeding and cleaning purposes can be accomplished.

In my U.S. Pat. No. 4,576,115 of March 18, 1986, such a tank cover is provided. While the tank cover of that patent accomplishes the above mentioned end purposes in an admirable fashion, there still exists a need for tank covers for animal and fish tanks which is of simpler and less complex construction. The present invention fulfills such need.

BRIEF STATEMENT OF THE INVENTION

In accordance with the invention there is provided a cover for an animal or fish tank or the like where the tank defines a peripheral enclosure having an open top 14 provided with a border. The cover is defined by a peripheral frame, the cross section of which comprises a horizontal wall adapted to be positioned over the top of the tank and a vertical skirt wall adapted to fit loosely over the exterior lip of the tank. The frame is provided further with a plurality of tabs depending in an array providing a degree of opposition to each other. Certain ones of the tabs depend fixedly from the vertical wall, and certain others of the tabs depend removably. These latter tabs are loosely and limitedly movable relative to the vertical wall by passing through an opening in the horizontal wall. The removable tab is provided at its lower end with an inwardly extruding shaped flange ad pated to engage the outer surface of the tank to act in an opposing biasing relationship to the fixed tabs to resiliently secure the cover on the tank.

Preferably, the shaped flange is extended beneath the lip of the tank out of normal contact therewith. On the other hand, the body of the removable tab is shaped and adapted to engage with the vertical skirt, so that the flange and tab body react against both the face of the tank and the vertical wall to provide resilient action.

Further details of the present invention are set forth in the following description, as well as in the accompanying drawings.

BRIEF DESCRIPTION OF THE DRAWINGS

In order to describe the inventive tank cover more fully, reference is directed to the accompanying drawings which are to be taken in conjunction with the following detailed description thereof, and in which drawings:

FIG. 1 is a perspective view, partially exploded of a tank provided with a cover in accordance with the invention;

FIG. 2 is a partial, sectional view in perspective of the tank and cover shown in FIG. 1 taken across the line indicated by the arrows 2—2 in FIG. 1, and illustrating the relationship of a removable tab with the tank and cover;

FIG. 3 is a partial, sectional view in perspective of the tank and cover illustrated in FIG. 1 showing the relationship of a fixed tab with the tank and cover;

DESCRIPTION OF THE PREFERRED EMBODIMENTS

Figure 4:
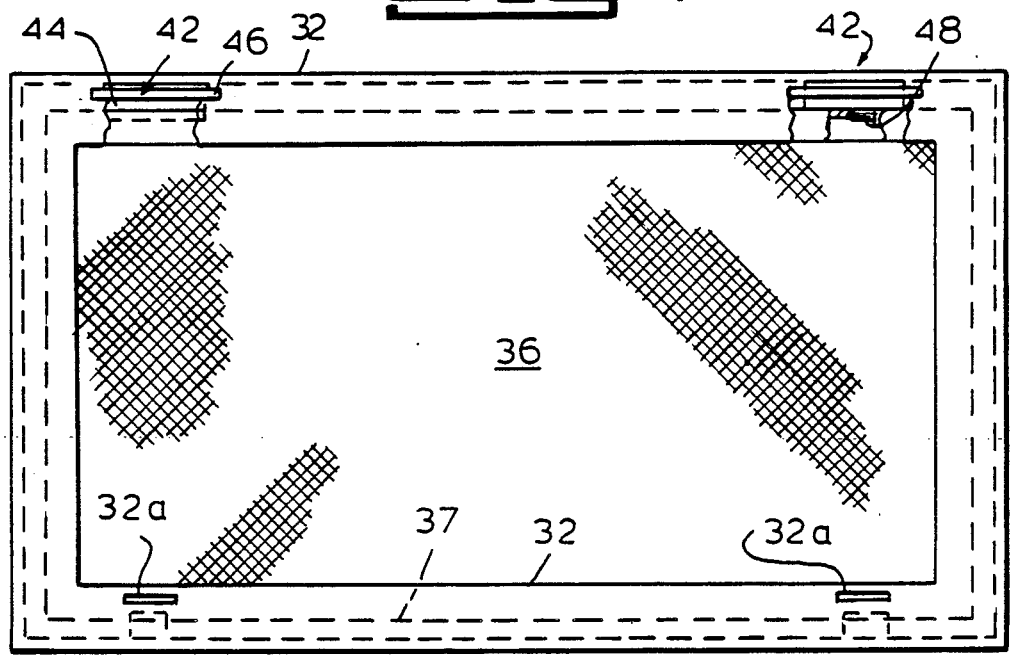
FIG. 4 is a plan view partially in section showing the cover in place on the tank and the movable tabs passing through the border and held loosely on the cover frame.

Referring now more particularly to FIG. 1, a cover generally identified by numeral 10, in accordance with the invention, is illustrated with an animal or fish tank, generally referred to by numeral 12, such as that shown in my prior patent. Tank 12 is illustrated as a rectilinear parallelepiped having glass walls, although it may have any desirable peripheral shape, such as a square shape, or circular shape or the like. No matter what its particular shape may be, tank 12 is formed with an open top 14 and is provided around its periphery with a reinforcing border 16 which strengthens the open top. The border 16, as illustrated in FIG. 2, may have an angular cross section providing a horizontal ledge 18 that generally overlies the top of the tank 12 and a vertical peripheral strip 20 extending a short distance downwardly along the side of the tank, thus reinforcing the tank 12 about its perimetric dimensions. The lower edge of the strip 20 forms a lip 22 spaced from the walls of the tank. The border 16 may be, if desired, provided only with the vertical strip 20.

Tank 12 may also be made of transparent plastic while border 16 may be made of a variety of materials, such as plastic, aluminum or other metals and the like, suitably adhered to the tank walls. When the border 16 is made of plastic, it can be molded about the glass or integrally formed with the plastic tank walls or separately applied thereto. On the other hand, the tank walls themselves along the upper edge may be thickened to provide an outwardly extending lip 22, at least along a substantial portion of a pair of oppositely disposed side walls, of the peripheral enclosure construction.

The cover 10 is conformingly rectangular comprising a frame having parallel front and rear sides 24 and 26, respectively, and lateral sides 28 and 30, respectively, all unitarily joined at their ends. Each of the sides 24, 26, 28 and 30 have a similar uniform cross section, as seen in FIGS. 2 and 3 comprising a horizontal wall 32 and a vertically depending skirt wall 34 (FIG. 2). A screen 36 is stretched horizontally across the frame and is permanently integrally secured to the inner or under surface of the horizontal walls 24, 26, 28 and 30 about the entire periphery of the frame, as shown by broken lines 37 in FIG. 1, in any conveniently suitable fashion. In practice, the frame is molded of plastic and is heat welded to the screen 36 by passing the heated plastic through and securing the plastic to the pores of the open mesh of the screen. The frame generally conforms dimemsionally loosely to the shape of the opening of tank 12 and is adapted to fit over the top 14 of the tank so that its horizontal walls 32 rest on the upper edge of the tank and its vertical skirt walls 34 depending over and slightly spaced from the side strips 20 of the border 16, thus closing the top of the tank.

Figure 5:
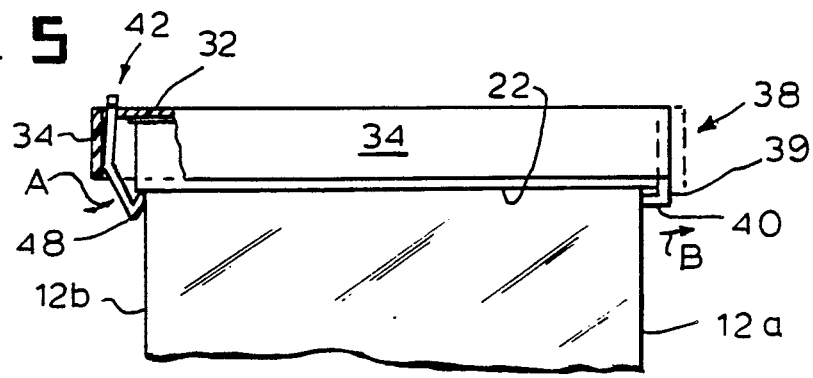
FIG. 5 is a partial end view, partially in section, of the tank and cover shown in FIG. 1 showing the disposition of a movable tab and a fixed tab in biased relationship to each other and leaning on the tank enclosure.

One edge, preferably the front edge 24 of the frame, is provided with a pair of fixed tabs 38 molded integrally and formed relatively vertical with the skirt wall 34. The tabs 38 are formed, as seen in FIG. 5, of a vertical body 39 at the end of which is formed a horizontal inwardly directed flange 40. The body 39 is of a length sufficient to enable the flange 40 to pass below the lip 22 to be out of contact with the band 16 or lip 22 when the cover is in place on the top of the tank, and to bear against the outer face 12a of the tank 12.

Figure 7:
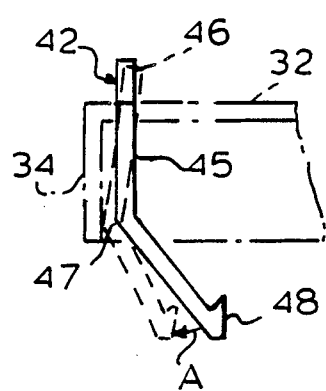
FIG. 7 is a partial, diagrammatic end view in section of the tank and cover illustrated in FIG. 1 and showing another embodiment of a movable tab in lateral elevation employed with the cover of this invention.

Depending from the horizontal wall 32 of rear side 26 of the cover 10, and in opposition to the fixed tabs 38 are a pair of removable shaped tabs 42, seen in detail in FIGS. 2, 5 and 7. Tabs 42 depend through opening 44 formed in horizontal wall 32 of the frame to the interior side of skirt wall 34, thus being interspaced between skirt wall 34 and the strip 20 of the border 16.

The removable tabs 42 are separable from the frame and comprise a body portion 45 having laterally extending wings 46 at its upper end, in order to prevent the tab from falling through slots 44, and an inwardly directed flange 48 at its lower end. The body 45 of the removable tab 42 is bent as at 47 along its length so as to provide it with a curvature or shape causing the flange 48 to extend inwardly toward the corresponding face 12b of the tank 12. The curved or bent body 45 of the tab 42 is thus caused to bear resiliently (arrow A, FIG. 5) against the skirt wall 34 and the flange 48 bearing against the vertical tank wall 12b. This provides an opposing biasing action in cooperation with tabs 38 when the cover is placed on the tank so that the tabs 38 also bear resiliently against the opposite tank wall 12a.

Figure 6:
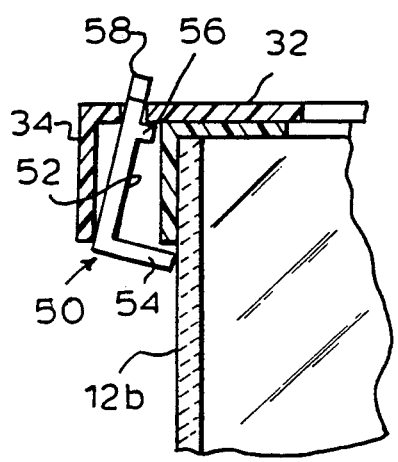
FIG. 6 is a partial end view in section of the tank and cover shown in FIG. 1 illustrating another embodiment of a movable tab employed with the cover of this invention.

As seen in FIG. 6, a modified tab 50 is provided with a straight unbent vertical body 52, the lower end of which is provided with a horizontal perpendicularly extending flange 54 of a size sufficient to bear against the face 12b of the tank 12. In this manner the flange 54 and the body 52 act respectively against the tank and the vertical skirt 34 in the same manner as discussed earlier. The body 52 is provided with an inwardly extending rib 56 disposed just below the lateral wings 58 by a distance about equal to the depth of the horizontal wall 32 so that the rib 56 engages with the lower surface of the wall 32 while the wings 58 engage with the upper surfaces. In this manner, the tab 50 cannot be inadvertently dislodged from its slot 32a when the cover 10 is removed in its entirety and separately transported or handled even in the inverted condition. Although as will be apparent, the tab may be removed by slight manipulation if desired.

It will be seen that in each embodiment, the cover is held on the tank by the resilient opposing forces of the tabs (both fixed and removable) established by providing the removable tabs with sufficient spring action against the face of the tank wall to force the opposite side of the cover to shift and press the fixed tabs against the corresponding face of the tank. It will also be observed that the flange, both of the fixed and removable tabs extend below the lip into contact only with the face of the tank, and do not normally engage the lip. This permits the cover a certain degree of vertical movement. However, because of the pressure of the tabs the movement of the cover is restricted once the flanges are lifted into contact with the lip. It is to be further observed that the removable tabs are biased, i.e. the spring action created) by the cooperation of the body portion against the skirt of the frame and the bearing of the flange on the tank.

On the other hand, due to the unique construction of the cover, it can be removed with ease, when desired. The fixed tabs 38, formed along the front edge of the cover 10 are resilient and flex along their lengths. Thus, they can be manually pulled in the direction of arrow B, as shown in FIG. 5, so that their flanges 40 can be moved away from tank wall 12a and the entire cover can be tilted rearwardly to displace the removable tabs 42 which bear against tank wall 12b. Thus, cover 10 can be removed from and returned quickly to the tank simply by flexing the fixed tabs 38. The cover may similarly be removed by displacing the removable tabs from the rear and tilting forward.

To facilitate pulling of the fixed tabs 38 without unduly flexing the body of the tabs in excess of their modulus of elasticity, the horizontal wall 32 may be provided with a weakened portion by providing slots 32A in the area of the tabs 38. This enables the frame to flex with the unitarily formed tabs 38 when they are manually displaced and to absorb such stressing forces along the greater area of the frame rather than concentrating them on the tabs alone.

Similarly, the cover may be returned to its fixed position on the tank 12 by reversing the operation, i.e. by placing the rear tabs 42 in engagement over the lip 22 and closing the cover in a typical downward motion such as if it were a hinged lid. The tabs 38 along the front border of the frame, and the frame itself being resilient, ride over the border 16 along the front of the tank until the flanges 40 are in place against tank wall 12a.

In another form, the fixed tabs or the removable may be congregated inwardly to the center of the frame from its end sides or even replaced along the front or back with a single tab so that for instance a triangular array is provided. In each instance, the pressure exerted by the biasing means at the rear will cause the frame to move rearwardly locking the flanges on the front border below the lip. As long as both the removable and fixed tabs are arrayed in substantial opposition to each other so that sufficient exertion of force is made, front to rear, on the walls of the tank, the cover will securely seat and lock into place.

Various changes, modifications and embodiments have been shown and described; others will be known to those skilled in the art. Accordingly, it is intended that the foregoing description be taken as illustrative of the present invention and not limiting of the same.

What is claimed is:

1. A cover for an animal tank, fish tank or the like, the tank defining a peripheral enclosure having an open top provided with a border having an exterior lip, said cover comprising a continuous frame, the cross section of which comprises a horizontal wall adapted to be positioned over the top of said tank and a vertical skirt wall adapted to fit loosely about the exterior lip of the border, said frame having a plurality of tabs depending therefrom, certain ones of said tabs depending fixedly from the vertical skirt of said frame on one side of said frame to engage the tank enclosure beneath said exterior lip and certain others of said tabs comprising separate removable tabs, said removable tabs being located in respective openings in the horizontal wall of said frame opposite to the side of said frame having the fixed tabs, each of said removable tabs comprising an elongated body, having at its lower end an inwardly extending flange, each of said removable tabs being shaped to depend freely and loosely through its associated opening with said body engaging the vertical skirt of said frame and said flange engaging with the tank enclosure to act in opposition to the fixed tabs on the opposite side to secure said cover on said tank top, said body being resiliently distensible into engagement with said vertical skirt member on engagement of the flange with the tank enclosure to bias said flange into continual contact with said tank enclosure.

2. The cover according to claim 1, wherein said removable tabs are provided with extending means at their upper end to prevent said tabs from falling downwardly through said holes.

3. The cover according to claim 1, wherein said body is bent along its length to provide a curvature causing said body to engage said skirt when said flange engages the face of the tank.

4. The cover according to claim 3, wherein said flange is in the form of a hook.

5. The cover according to claim 1, wherein said body is planar and said flange extends perpendicular thereto; said flange being sufficiently large to cause said body to engage the vertical skirt when said flange is in engagement with the face of the tank.

6. The cover according to claim 5, wherein each said body of said removable tabs is provided with an inwardly extending rib transversely below the horizontal wall of said frame to engage the lower surface thereof to prevent the tab from being dislodged from said opening.

7. The cover according to claim 1, wherein the fixedly depending tabs are integrally formed with the frame and are sufficiently flexible so as to be manually releasable from engagement beneath the lip of the tank allowing removal of said cover without removing said other tabs.

8. The cover according to claim 7, wherein that section of the frame from which the tabs fixedly depend and with which said tabs are integral is provided with a weakened area to enable said frame to flex so that said tabs may be manually displaced with respect to the lip of the tank for disengagement.

* * * * *